United States Patent [19]

Østlyngen et al.

[11] Patent Number: 5,934,379

[45] Date of Patent: *Aug. 10, 1999

[54] METHOD AND APPARATUS FOR DETECTION AND PREVENTION OF FIRE HAZARD

[75] Inventors: Tom Wilhelm Østlyngen; Bjørn Thronæs, both of Oslo, Norway

[73] Assignee: Norsk Hydro A.S., Oslo, Norway

[*] Notice: This patent issued on a continued prosecution application filed under 37 CFR 1.53(d), and is subject to the twenty year patent term provisions of 35 U.S.C. 154(a)(2).

[21] Appl. No.: 08/726,926

[22] Filed: Oct. 3, 1996

Related U.S. Application Data

[63] Continuation-in-part of application No. PCT/NO95/00221, Dec. 1, 1995, abandoned.

[30] Foreign Application Priority Data

Dec. 2, 1994 [NO] Norway ..................................... 944667

[51] Int. Cl.⁶ ....................................................... A62C 3/07
[52] U.S. Cl. ................................................. 169/46; 169/62
[58] Field of Search ................................. 169/46, 60, 61, 169/62, 11

[56] References Cited

U.S. PATENT DOCUMENTS

| | | | |
|---|---|---|---|
| 2,202,343 | 5/1940 | Geertz | 169/11 |
| 3,788,666 | 1/1974 | Kramer et al. | 280/739 |
| 4,248,309 | 2/1981 | Hofle et al. | 169/47 |
| 4,311,198 | 1/1982 | Vasquez | 169/11 |
| 4,423,784 | 1/1984 | Bolen | 169/62 |
| 5,515,691 | 5/1996 | Wertenbach et al. | 62/133 |

FOREIGN PATENT DOCUMENTS

| | | |
|---|---|---|
| 675 013 | 10/1995 | European Pat. Off. . |
| 2 674 441 | 10/1992 | France . |

*Primary Examiner*—Andrew C. Pike
*Attorney, Agent, or Firm*—Wenderoth, Lind & Ponack, L.L.P.

[57] ABSTRACT

A fire hazard is automatically detected and a fire is prevented or extinguished in an automotive vehicle upon such vehicle being involved in a collision. The vehicle has an air conditioning system including a container and employing $CO_2$ as a refrigerant. The occurrence of a collision is detected by an impact sensor. In response to detection of the collision by such a sensor, a processing/control unit opens a valve in a line connected to an outlet at or near a bottom of the container. Thereby, the $CO_2$ refrigerant is released substantially in liquid phase from the container and passed through the line and is discharged as a fire extinguishing agent into various parts of the vehicle, for example the engine compartment.

16 Claims, 3 Drawing Sheets

METHOD AND APPARATUS FOR DETECTION AND PREVENTION OF FIRE HAZARD

This application is a continuation-in-part of International Application PCT/NO95/00221, filed Dec. 1, 1995, now abandoned.

BACKGROUND OF THE INVENTION

The present invention relates to a system for automatically detecting a fire hazard and for preventing/extinguishing a fire, particularly for a vehicle provided with an internal combustion engine.

Automotive vehicles having engines of the above mentioned type involved in accidents and exposed to violent impacts (crashes) have a tendency to be set on fire during or right after the accidents. This is especially the case for fuel injection engines where the feeding pump continues to provide fuel under pressure, thus representing a great hazard for the occupants of the vehicle. Use of portable fire extinguishing containers to extinguish a fire in an engine compartment is a risky and time demanding task involving exposure to smoke and flames of persons opening the engine compartment and furthermore allowing for inlet of air through the open hood into the engine compartment, thus promoting a spread of the fire.

Consequently, various systems based on automatic detection and extinguishing of a fire recently have been developed and described in several patent applications/patents. Thus, French FR 2,674,441 discloses a system based on use of HALON 13-01 as a extinguishing agent and being situated in a pressure vessel in an engine compartment. The system is activated by detectors of a frontal or lateral impact, or supplementarily by smoke and/or flame detectors. A system of pipelines and nozzles provides, upon detection, automatic discharge of HALON directly to the engine compartment and simultaneously provides for switch off of the fuel pump.

German DE 4,223,293 A1 discloses a combined personal vehicle and truck (lorry) fire protection system based on detection of fire and use of $CO_2$ as a fire extinguishing agent.

Disadvantages connected to installation/use of these and other known extinguishing systems are the necessity of positioning voluminous containers and auxiliary equipment (detectors, sensors, transducers) in the engine compartment that is lacking in free space and, further, increasing the weight and consequently the cost of the detection and extinguishing system.

Furthermore, Russian RU 2,008,046 describes another fire extinguishing system based on discharge of radiator cooling fluid (water) or an ethylene glycol mixture for fire extinction assisted by pressurized propellant, e.g., $CO_2$ gas. The claimed advantage of such system is avoidance of special "bulky" containers for the extinguishing agent in the vehicles. However, use of cooling water as an extinguishing agent gives a poor extinguishing efficiency, limited capacity (leakages and losses due to direct through-streaming) and is definitely not applicable for fire preventing purposes.

SUMMARY OF THE INVENTION

Consequently, it is an object of the present invention to provide a new and improved automatic fire extinguishing system ensuring increased safety for the occupants of motor vehicles in case of accidents by preventively applying fire extinguishing agents immediately after impact detection.

Another object of the present invention is to provide a new, fast responding (reacting) detection system reducing the number of employed components/parts and thus reducing the weight and cost of the installed detection and extinguishing system.

Still another object of the present invention is to provide a method and means for a differential or delayed release of an extinguishing agent or fluid that is of an environmentally acceptable and benign type and that preferentially already is installed and employed in the vehicle for other purposes and functions.

These and other objects and features of the present invention are achieved by the discharge of $CO_2$ as an extinguishing agent from a pressurized container that is part of an air conditioning system installed in a vehicle. The $CO_2$ is discharged from an outlet arranged at or near the bottom of the pressurized container. This unique feature of the present invention results in achieving a much more rapid release of the $CO_2$ charge from the pressurized container. Thus, more of the $CO_2$ charge is directed to a position of use for fire extinguishing or prevention purposes during the critical first seconds after occurrence of a vehicle accident.

According to the invention, a new fast responding system for detection/prevention/extinguishing of fire is based, in a preferred embodiment of the system, on use as an extinguishing agent of $CO_2$ that already is installed in the vehicle as a refrigerant in an air conditioning circuit of the vehicle. The detection of fire is linked directly to detection of front, side, and/or rear impacts and activation of an airbag protection system of the vehicle.

The apparent advantage of using $CO_2$ as an agent preventing fire in connection with a vehicle being involved in an accident is a combination of the following characteristic features:

cooling of the entire engine compartment below the fuel ignition temperature, prolonged contact with cooling agent due to a partial formation of $CO_2$—adhering snow or ice and following sublimation providing $CO_2$ in gas form, and an efficient reduction of the $O_2$ content in the closed/encapsulated rooms/compartments below the concentration required for burning (oxidation reaction).

BRIEF DESCRIPTION OF THE DRAWINGS

The invention will be more readily understood and apparent from the following description of preferred embodiments and mode of operation of the system, with reference to the accompanying drawings, wherein.

DETAILED DESCRIPTION OF THE INVENTION

Figure 1:
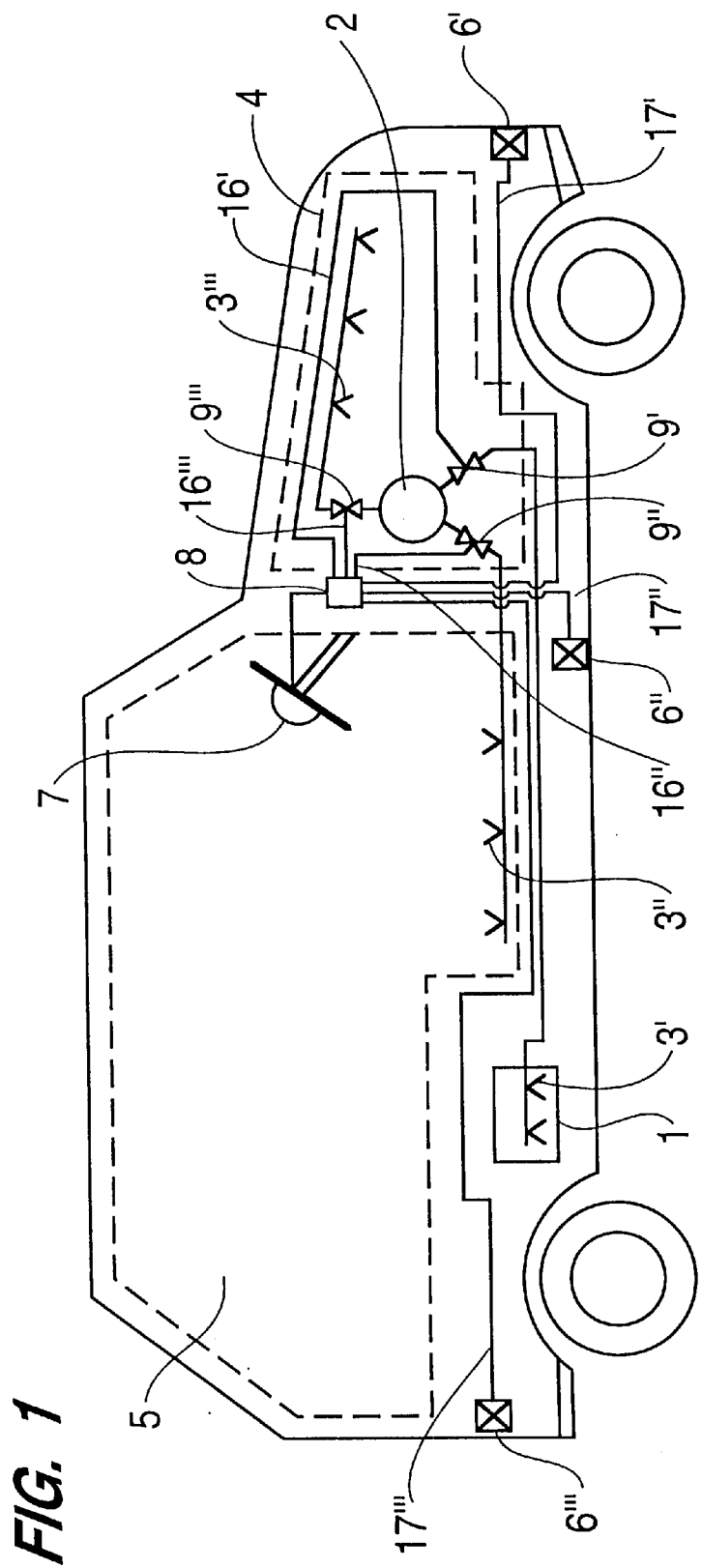
FIG. 1 is a schematic side view of a vehicle accommodating components of an automatic fire hazard detection and fire preventing/extinguishing system according to the invention.

FIG. 1 is a schematic cross-sectional view of an automotive vehicle including a conventionally situated front engine compartment 4 accommodating a vehicle engine (not shown) and a rear situated fuel tank 1.

A container (vessel) 2 contains by way of example liquid $CO_2$ as a fire extinguishing agent. Pressure (impact) sensors or detectors situated strategically at sites and level(s) of expected impact, such as a front impact detector 6', side impact detector 6", and rear impact detector 6''', respectively are operably linked by transmission/control lines 17', 17", 17''' to a processing/control unit 8 providing control signals through transmission lines 16', 16", 16''' to manipulate valves 9', 9", 9''' opening/closing access of the extinguishing agent to a set of independently operable nozzles 3', 3", 3'''. Nozzles 3''' are situated in the engine compartment 4. Nozzles 3' ensure release of the agent over the fuel tank 1. Nozzles 3", preferably delayed for predetermined period of time allowing passengers to leave the vehicle, discharge the agent into passenger compartment 5. Delayed release of the agent may be accomplished by a time delay circuit in the processing/control unit 8 that ensures that the extinguishing agent will be discharged according to a pre-programmed pattern. Such pre-programmed pattern may also include a control of the duration of the discharge of extinguishing agent at each location of the nozzles. Alternatively, time delay elements and/or flow restrictors may be provided in the lines supplying extinguishing agent to the nozzles. Advantageously, the sensors/detectors 6 are identical with sensors deployed or employed in connection with release/activation of installed airbag(s) 7 for protection of front seat occupants in the vehicle.

Figure 2:
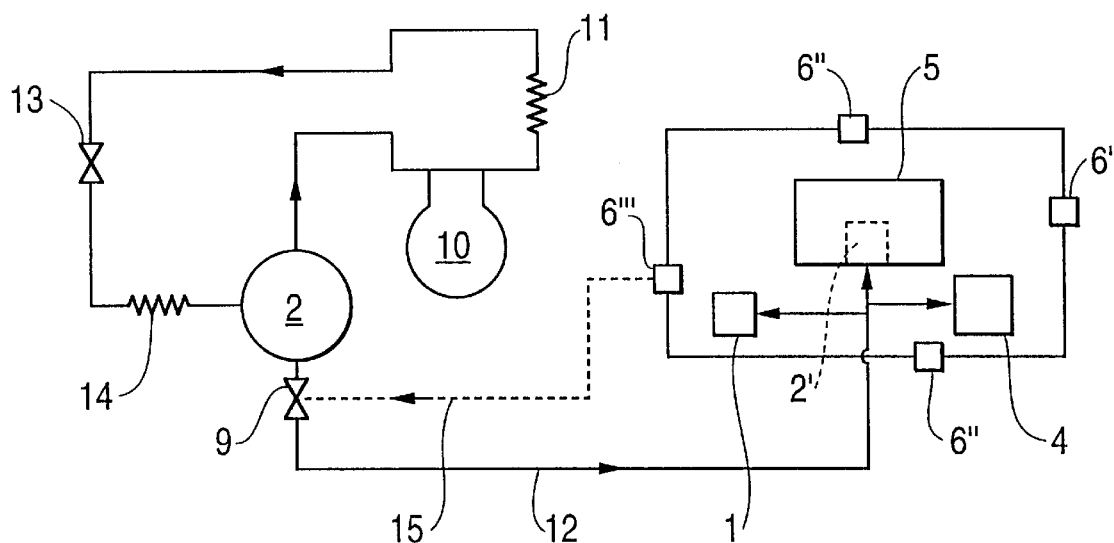
FIG. 2 is a schematic diagram of the system and its operably linked components according to the invention.

According to a preferred embodiment of the system, the pressurized container 2 is an integrated part of a vehicle air conditioning circuit using $CO_2$ as refrigerant. As shown in FIG. 2, illustrating schematically the connection between the fire preventing/extinguishing system and installed air conditioning assembly, the impact detectors 6'–6''' are connected through a transmission/signal line 15 to a valve 9 (corresponding to valves 9'–9''') attached to the bottom of pressurized container 2 that is an integral part as a buffer vessel (receiver) of a (transcritical) vapor compression cycle air condition system. Such system further includes a compressor 10, a gas cooler 11, a throttling valve 13, and an evaporator 14 connected in series into a closed circuit. The valve 9 advantageously may be operated by hydraulic or pneumatic means. Upon detection of an impact, the sensor(s) transmits a signal through transmission/signal line 15 to open the valve 9. This will cause pressurized $CO_2$ to flow from the bottom of container 2 via conduit 12 to the actual fire locations or potential fire locations, e.g., fuel tank 1, engine compartment 4, and/or passenger compartment 5.

Thus, there is no need for either additional impact sensors or a voluminous special container for the fire extinguishing agent. A simple adaptation of the buffer vessel (receiver) 2 by provision of an extra valve 9 and connecting line will eliminate the need for installation of a new container for fire extinguishing purposes.

EXAMPLE

Figure 3:
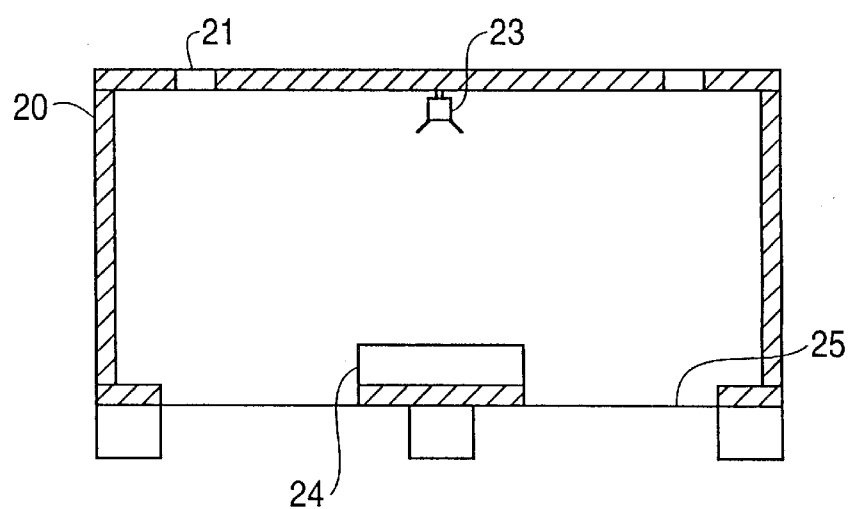
FIG. 3 is a cross section of a test apparatus used in extinguishing tests.

A fire extinguishing test was performed in a container provided with closed side walls 20, a partly open bottom section 25, and a top plate perforated with plural small holes 21 as shown in the cross-sectional view of FIG. 3. The container was of a size similar to that of an engine compartment in an average personal car, i.e., height 0.5 meter, width 0.72 meter, and length 1.12 meters. The inside volume of the container was about 400 liters. A nozzle device 23 with three openings, each of a diameter of 1 millimeter, was centrally placed at the underside of the top plate. A vessel 24 with a diameter of 0.19 meter and height of 0.075 meter was centrally placed in the bottom of the container. Before the extinguishing tests were carried out, it was observed that 0.2 liter of gasoline was able to burn for about ten minutes. The extinguishing equipment comprised pressurized $CO_2$ ejected through the nozzle device 23. The capacity of the extinguishing equipment was about 60 grams of $CO_2$ per second. Four extinguishing tests were conducted, where the extinguishing agent was ejected through the nozzles after the fire was allowed to burn for about one minute. The time to extinguish the fire was less than five seconds in all the tests. In each extinguishing test, less than 300 grams of $CO_2$ was consumed.

Using pressurized $CO_2$ that is already provided in a vehicle air conditioning circuit employing $CO_2$ as refrigerant, there will customarily be about two kilos of $CO_2$ available for extinguishing purposes. Thus, it therefore should be ensured that there will be a sufficient amount of $CO_2$ available to extinguish a possible fire in the engine compartment in addition to possible fires at other locations in the vehicle.

In accordance with a further feature of the present invention, the discharge of the $CO_2$ from the pressurized container 2 occurs at an outlet that is arranged at or near the bottom of container 2. This is illustrated in FIG. 2, wherein the $CO_2$ is discharged, by opening valve 9, from the bottom of container 2. Particularly, the $CO_2$ that is discharged is substantially in a liquid phase upon release from container 2. This feature of the present invention results in a more rapid release of a larger quantity of the $CO_2$ charge from container 2. Specifically, this feature of the present invention provides this advantage in comparison with the result that would occur if the outlet were located at or near the top of the container 2, in which case the $CO_2$ would be released substantially, at least initially, in a gaseous phase. This advantage is illustrated in FIG. 4 that shows results of tests wherein the $CO_2$ charge is released from the bottom of container 2 compared with release of the $CO_2$ charge from the top of container 2.

Figure 4:
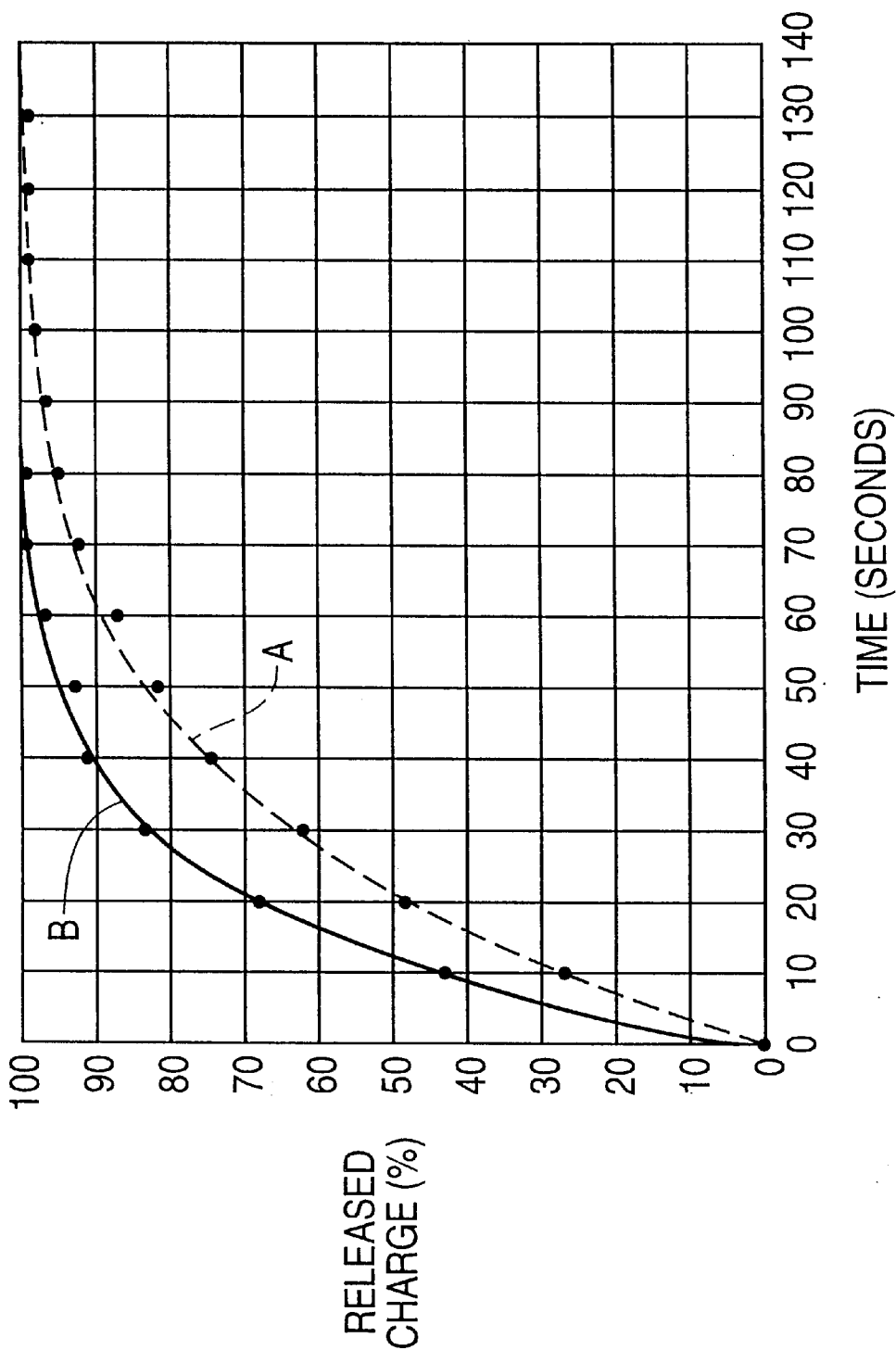
FIG. 4 is a graph illustrating results of tests.

Thus, with reference to FIG. 4, curve A represents a plot of the percentage of the $CO_2$ charge released from container 2 versus time, when the $CO_2$ is released from the top of the container. Curve B represents a plot of the percentage of $CO_2$ charge released per unit time when the $CO_2$ is released from the bottom of container 2. It will be apparent from a consideration of FIG. 4 that, when the $CO_2$ is released from the bottom of the container, a greater percentage of the charge is released from the container during any given time period. For example, when the $CO_2$ is released from the top of the container, approximately 21 seconds are required to achieve a release of 50 percent of the charge of the $CO_2$ in the container, compared with a time of only approximately 11 or 12 seconds when the release is from the bottom of the container. Similarly, when the release is from the top of the container, it takes approximately 48 seconds to achieve release of 80% of the $CO_2$ charge. This compares with approximately 26 seconds when the release is from the bottom of the container.

Therefore, in accordance with this feature of the present invention, it is possible to achieve a quicker release of a greater percentage of the $CO_2$ within the pressurized container. This results in the ability to rapidly lower the oxygen concentration in the area of use, e.g., in the engine compartment, during the critical first seconds after an accident. Thus, to prevent fire or spread of fire, it is of utmost importance to dilute the oxygen concentration as soon as possible. This is achieved more quickly in accordance with the invention.

According to another inventive aspect of the present system, the presence of an already installed $CO_2$—buffer container in the air conditioning circuit allows for possible in-situ provision of a more gentle fire extinguishing agent to be applied in the passenger compartment. Thus, e.g., an additional vessel 2' containing a mixture of nitrogen and argon gases may be installed, e.g., in the passenger compartment, and connected to the $CO_2$—container so that by coordinated "bleeding" of some $CO_2$ upon impact detection into such gas mixture a special agent known as INERGEN® or similar agents may be provided insitu to avoid shock (cooling) to the vehicle occupants and even danger of suffocation by use of pure $CO_2$.

The scope of the present invention is not limited to the above described and exemplified preferred embodiments. The disclosed inventive principle of automatic detection of a fire hazard and the fire extinguishing system can also be employed, e.g., in battery powered vehicles, and a combination of automatic, semiautomatic or even manual means for activation/switch-off of the system is possible within the scope of the present invention.

We claim:

1. A method of automatic detection of a fire hazard and of prevention or extinguishing of a fire in an automotive vehicle upon said vehicle being involved in a collision, said vehicle having an air conditioning system including a container and employing liquid $CO_2$ as a refrigerant, said method comprising:

sensing said collision by an impact sensor;

in response to said sensing of said collision by said sensor, opening a valve in a line connected to an outlet of said container; and thereby releasing said liquid $CO_2$ from said container and passing said liquid $CO_2$ through said line and discharging said liquid $CO_2$ as a fire extinguishing agent into a part of said vehicle, thereby to prevent or extinguish the fire thereat.

2. A method as claimed in claim 1, wherein said discharging comprises discharging said liquid $CO_2$ through at least one nozzle into said part of said vehicle.

3. A method as claimed in claim 1, wherein said discharging comprises discharging said liquid $CO_2$ into plural parts of said vehicle.

4. A method as claimed in claim 3, wherein said discharging into said plural parts is controlled according to a preprogrammed timing pattern.

5. A method as claimed in claim 1, wherein said part comprises an engine compartment of said vehicle, and said discharging occurs simultaneously with activation of an airbag of said vehicle.

6. A method as claimed in claim 1, wherein said part comprises a passenger compartment of said vehicle, and said discharging occurs at a predetermined period of time after said sensing of said collision.

7. A method as claimed in claim 1, further comprising adding $N_2$ and argon to said liquid $CO_2$ prior to said discharging.

8. A method as claimed in claim 1, wherein said outlet is connected at or adjacent a bottom of said container.

9. An automotive vehicle having an air conditioning system including a container and employing liquid $CO_2$ as a refrigerant, and an apparatus for automatic detection of a fire hazard and for preventing or extinguishing a fire in said vehicle upon said vehicle being involved in a collision, said apparatus comprising:

an impact sensor positioned to detect the collision;

a line leading from an outlet of said container to a part of said vehicle; and a valve in said line and connected to said sensor, said valve being operable to be opened in response to detection of the collision by said sensor, thereby to release said liquid $CO_2$ from said container and to pass said liquid $CO_2$ through said line and discharge said liquid $CO_2$ as a fire extinguishing agent into said part of said vehicle, thus to prevent or extinguish the fire thereat.

10. An automotive vehicle as claimed in claim 9, further comprising at least one nozzle for discharging said liquid $CO_2$ into said part of said vehicle.

11. An automotive vehicle as claimed in claim 9, further comprising means for discharging said liquid $CO_2$ into plural parts of said vehicle.

12. An automotive vehicle as claimed in claim 11, further comprising a processing/control unit for controlling said discharging into said plural parts according to a preprogrammed timing pattern.

13. An automotive vehicle as claimed in claim 9, wherein said part comprises an engine compartment of said vehicle, and further comprising a processing/control unit connected to said sensor and said valve to cause the discharge to occur simultaneously with activation of an airbag of said vehicle.

14. An automotive vehicle as claimed in claim 9, wherein said part comprises a passenger compartment of said vehicle, and further comprising a processing/control unit connected to said sensor and said valve to cause the discharge to occur at a predetermined period of time after detection of said collision.

15. An automotive vehicle as claimed in claim 9, further comprising means for adding $N_2$ and argon to said liquid $CO_2$ prior to the discharge.

16. An automotive vehicle as claimed in claim 9, wherein said outlet is located at or adjacent a bottom of said container.

* * * * *